(12) United States Patent
Seo

(10) Patent No.: US 10,302,671 B2
(45) Date of Patent: May 28, 2019

(54) PHYSICAL QUANTITY DETECTION CIRCUIT, PHYSICAL QUANTITY DETECTION DEVICE, ELECTRONIC APPARATUS AND MOVING OBJECT

(71) Applicant: Seiko Epson Corporation, Tokyo (JP)

(72) Inventor: Kentaro Seo, Minowa (JP)

(73) Assignee: Seiko Epson Corporation (JP)

( * ) Notice: Subject to any disclaimer, the term of this patent is extended or adjusted under 35 U.S.C. 154(b) by 892 days.

(21) Appl. No.: 14/258,340

(22) Filed: Apr. 22, 2014

(65) Prior Publication Data

US 2014/0324375 A1    Oct. 30, 2014

(30) Foreign Application Priority Data

Apr. 24, 2013  (JP) ................... 2013-090861

(51) Int. Cl.
*G01P 21/00* (2006.01)
*G01P 15/00* (2006.01)
*G01C 19/5726* (2012.01)

(52) U.S. Cl.
CPC .......... *G01P 21/00* (2013.01); *G01C 19/5726* (2013.01); *G01P 15/00* (2013.01)

(58) Field of Classification Search
None
See application file for complete search history.

(56) References Cited

U.S. PATENT DOCUMENTS

| 3,388,241 | A | * | 6/1968 | Isaacs | G06F 17/18 327/336 |
| 4,050,297 | A | * | 9/1977 | Pettingell | G01M 15/05 73/114.59 |
| 4,193,118 | A | * | 3/1980 | Nash | G06F 17/18 702/199 |
| 4,501,149 | A | * | 2/1985 | Konno | G01N 29/14 702/39 |
| 4,531,193 | A | * | 7/1985 | Yasuhara | G01D 5/248 377/19 |
| 4,701,875 | A | * | 10/1987 | Konishi | H03H 17/06 708/420 |

(Continued)

FOREIGN PATENT DOCUMENTS

JP  02-181870 A  7/1990
JP  04-346024 A  12/1992
(Continued)

*Primary Examiner* — Janet L Suglo
*Assistant Examiner* — Leonard S Liang
(74) *Attorney, Agent, or Firm* — Harness, Dickey & Pierce, P.L.C.

(57) ABSTRACT

A detection circuit (physical quantity detection circuit) includes a ΔΣ modulator (A/D converter) that digitizes a detection signal corresponding to a physical quantity and outputs detection data, an arithmetic operating portion that includes at least one of adders and a multiplier, a main sequence counter (counter) that counts the number of clocks of a clock signal and initializes a count value periodically, and a control circuit (control portion) that causes the arithmetic operating portion to perform a plurality of arithmetic operation processes, having types different from each other, for generating arithmetic operation data according to a magnitude of the physical quantity on the basis of the detection data, in accordance with the count value.

5 Claims, 12 Drawing Sheets

(56) References Cited

U.S. PATENT DOCUMENTS

| | | | |
|---|---|---|---|
| 4,727,505 A * | 2/1988 | Konishi | H03H 17/0238 |
| | | | 708/420 |
| 4,881,071 A * | 11/1989 | Monterosso | G08C 15/06 |
| | | | 340/870.01 |
| 5,161,247 A | 11/1992 | Murakami et al. | |
| 5,388,236 A | 2/1995 | Murakami et al. | |
| 5,421,023 A | 5/1995 | Murakami | |
| 5,442,799 A | 8/1995 | Murakami et al. | |
| 5,504,916 A | 4/1996 | Murakami et al. | |
| 6,082,196 A * | 7/2000 | Nonoyama | G01P 15/125 |
| | | | 73/514.18 |
| 6,188,340 B1 | 2/2001 | Matsumoto et al. | |
| 8,314,662 B2 * | 11/2012 | Isohata | H03L 1/027 |
| | | | 331/154 |
| 8,850,887 B2 * | 10/2014 | Yanagisawa | G01C 19/56 |
| | | | 73/504.12 |
| 2003/0005391 A1 | 1/2003 | Matsumoto et al. | |
| 2005/0216102 A1 * | 9/2005 | Tanizawa | G01D 3/022 |
| | | | 700/28 |
| 2006/0184301 A1 * | 8/2006 | Konno | B60R 16/0233 |
| | | | 701/45 |
| 2006/0239063 A1 | 10/2006 | Matsumoto et al. | |
| 2008/0215661 A1 * | 9/2008 | Aono | G01D 5/2448 |
| | | | 708/530 |
| 2008/0224913 A1 * | 9/2008 | Suzuki | H04N 5/335 |
| | | | 341/155 |
| 2009/0026352 A1 * | 1/2009 | Shimomura | H04N 5/378 |
| | | | 250/214 R |
| 2009/0217757 A1 | 9/2009 | Nozawa | |
| 2010/0106445 A1 * | 4/2010 | Kondoh | G01C 21/28 |
| | | | 702/96 |
| 2010/0169028 A1 * | 7/2010 | Shiraki | G01N 29/32 |
| | | | 702/56 |
| 2010/0206074 A1 * | 8/2010 | Yoshida | G01C 19/56 |
| | | | 73/504.12 |
| 2011/0080153 A1 * | 4/2011 | Metzger | G05F 3/20 |
| | | | 323/311 |
| 2011/0234441 A1 * | 9/2011 | Makihara | H03M 1/1225 |
| | | | 341/172 |
| 2012/0055230 A1 * | 3/2012 | Naruse | G01C 19/5726 |
| | | | 73/1.37 |
| 2012/0103093 A1 * | 5/2012 | Yanagisawa | H03F 1/26 |
| | | | 73/504.12 |
| 2013/0055815 A1 * | 3/2013 | Yanagisawa | G01C 19/5649 |
| | | | 73/579 |
| 2013/0151894 A1 * | 6/2013 | Honda | G06F 11/1405 |
| | | | 714/17 |
| 2013/0315366 A1 * | 11/2013 | Ooshima | G04F 10/00 |
| | | | 377/19 |
| 2014/0020503 A1 * | 1/2014 | Yamaguchi | G01P 9/04 |
| | | | 74/5 R |
| 2014/0077664 A1 * | 3/2014 | Ogura | G01C 19/5712 |
| | | | 310/370 |
| 2014/0290362 A1 * | 10/2014 | Nakagawa | G01C 19/5607 |
| | | | 73/504.16 |
| 2015/0204690 A1 * | 7/2015 | Shimada | G01C 19/5776 |
| | | | 702/96 |

FOREIGN PATENT DOCUMENTS

| | | |
|---|---|---|
| JP | 2000-018964 A | 1/2000 |
| JP | 2007-327943 A | 12/2007 |
| JP | 2009-229447 A | 10/2009 |
| JP | 2012-159429 A | 8/2012 |

* cited by examiner

| MAIN SEQUENCE COUNTER VALUE | ARITHMETIC OPERATION TO BE EXECUTED |
|---|---|
| 0 | DIGITAL FILTER CALCULATION (P1) |
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | OFFSET CORRECTION CALCULATION (P2) |
| 26 | GAIN CORRECTION CALCULATION (P3) |
| 27 | |
| 28 | INPUT RANGE CALCULATION (P4) |
| 29 | BIT LIMITATION CALCULATION (P5) |
| 30 | OUTPUT CODE AVERAGE CALCULATION (P6) |
| 31 | SUB-ARITHMETIC OPERATION SEQUENCE (P7 TO P16) |

FIG. 8

| SUB-SEQUENCE COUNTER VALUE | ARITHMETIC OPERATION TO BE EXECUTED |
|---|---|
| 0 | MOVING AVERAGE CALCULATION OF TEMPERATURE DATA (P7)<br>GAIN CORRECTION CALCULATION OF TEMPERATURE DATA (P8)<br>OFFSET CORRECTION CALCULATION OF TEMPERATURE DATA (P9) |
| 1 | |
| 2 | |
| 3 | |
| 4 | |
| 5 | |
| 6 | SENSITIVITY TEMPERATURE FLUCTUATION CORRECTION AMOUNT CALCULATION (P10) |
| 7 | |
| 8 | |
| 9 | |
| 10 | |
| 11 | |
| 12 | SENSITIVITY CORRECTION AMOUNT CALCULATION (P11) |
| 13 | |
| 14 | OFFSET TEMPERATURE FLUCTUATION CORRECTION AMOUNT CALCULATION (P12)<br>MOVING AVERAGE CALCULATION OF POWER SUPPLY VOLTAGE DATA (P13)<br>OFFSET CORRECTION CALCULATION OF POWER SUPPLY VOLTAGE DATA (P14) |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | |
| 28 | |
| 29 | OFFSET POWER SUPPLY VOLTAGE FLUCTUATION CORRECTION AMOUNT CALCULATION (P15) |
| 30 | |
| 31 | |
| 32 | |
| 33 | |
| 34 | |
| 35 | |
| 36 | OFFSET CORRECTION AMOUNT CALCULATION (P16) |
| 37 | |
| 38 | |
| 39 | STANDBY |
| ⋮ | |
| 249 | |

FIG. 9

PHYSICAL QUANTITY DETECTION CIRCUIT, PHYSICAL QUANTITY DETECTION DEVICE, ELECTRONIC APPARATUS AND MOVING OBJECT

BACKGROUND

1. Technical Field

The present invention relates to a physical quantity detection circuit, a physical quantity detection device, an electronic apparatus and a moving object.

2. Related Art

Nowadays, physical quantity detection devices, such as an acceleration sensor that detects an acceleration and a gyro sensor that detects an angular velocity, which are capable of detecting various physical quantities are being widely used in various systems and electronic apparatuses. In recent years, physical quantity detection devices have been mounted on automobiles and the like, and have required high detection accuracy and high reliability even under noisy environments.

The physical quantity detection device that outputs detection information of a physical quantity as a digital signal outputs a digital signal having high noise resistance, thereby allowing high reliability to be secured even under noisy environments. For example, JP-A-2009-229447 proposes a physical quantity measuring device including a detection circuit that detects an analog signal which is output from a vibrator by a detector circuit, and then converts the detected signal into a digital signal by an A/D converter to output the converted signal. In the physical quantity measuring device disclosed in JP-A-2009-229447, it is considered that the detection circuit is constituted by an analog circuit and is replaced by a digital circuit in order to improve detection accuracy. For example, JP-A-2007-327943 discloses that in a detection device that includes a detection circuit having a filter portion, a discrete-time filter (SCF) constituting the filter portion is able to be replaced by a digital filter.

However, there is a problem in terms of cost, because when a detection circuit of an existing physical quantity detection device is simply replaced by a digital circuit, the number of adders or multipliers increases and thus a circuit scale increases.

SUMMARY

An advantage of some aspects of the invention is to provide a physical quantity detection circuit capable of digital processing while suppressing an increase in the circuit scale, and a physical quantity detection device, an electronic apparatus and a moving object using such a physical quantity detection circuit.

An aspect of the invention can be implemented as the following forms or application examples.

Application Example 1

This application example is directed to a physical quantity detection circuit including: an A/D converter that digitizes a detection signal corresponding to a physical quantity and outputs detection data; an arithmetic operating portion that includes at least one of an adder and a multiplier; a counter that counts the number of clocks of a clock signal and initializes a count value periodically; and a control portion that causes the arithmetic operating portion to perform a plurality of arithmetic operation processes, having types different from each other, for generating arithmetic operation data according to a magnitude of the physical quantity on the basis of the detection data, in accordance with the count value.

According to the physical quantity detection circuit of this application example, a plurality of types of arithmetic operation processes required for generating the arithmetic operation data for one period of sampling are performed at high speed by sharing the arithmetic operation unit, thereby allowing digital processing to be performed while suppressing an increase in the circuit scale.

Application Example 2

In the physical quantity detection circuit according to the application example described above, the arithmetic operating portion may include an adder, and the control portion may cause the arithmetic operating portion to perform a digital filtering process on the detection data, and cause the adder to perform an offset correction process on a signal on which the digital filtering process is performed.

According to the physical quantity detection circuit of this application example, it is possible to perform the digital filtering process and the offset correction process by sharing the adder.

Application Example 3

The physical quantity detection circuit according to the application example described above may further include: a sub-counter that counts a cycle number of the counter and initializes a count value periodically; and a temperature sensor, and the arithmetic operating portion may perform an offset correction amount calculation process of calculating an offset correction amount used for the offset correction process, on the basis of temperature information of the temperature sensor, and the control portion may cause the arithmetic operating portion to perform the offset correction amount calculation process in accordance with the count value of the sub-counter.

According to the physical quantity detection circuit of this application example, the process of calculating the offset correction amount over a plurality of periods of sampling is performed, thereby allowing the amount of calculation per period of the sampling to be reduced.

Application Example 4

The physical quantity detection circuit according to the application example described above may further include: a sub-counter that counts a cycle number of the counter and initializes a count value periodically; a temperature sensor; and a power supply voltage sensor, and the arithmetic operating portion may perform an offset correction amount calculation process of calculating an offset correction amount used for the offset correction process, on the basis of temperature information of the temperature sensor and power supply voltage information of the power supply voltage sensor, and the control portion may cause the arithmetic operation unit to perform the offset correction amount calculation process in accordance with the count value of the sub-counter.

According to the physical quantity detection circuit of this application example, an offset correction amount for a fluctuation in temperature and an offset correction amount for a fluctuation in power supply voltage are not separately added (added twice) to the detection data in one period of the sampling, but the offset correction amount for a fluctuation in temperature and the offset correction amount for a fluctuation in power supply voltage are added thereto once in a plurality of periods of the sampling, and the offset correction amount is added (added once) to the detection data in one period of the sampling, thereby allowing the amount of calculation to be reduced.

Application Example 5

In the physical quantity detection circuit according to the application example described above, the arithmetic operating portion may include a multiplier, and the control portion may cause the arithmetic operating portion to perform a digital filtering process on the detection data, and cause the multiplier to perform a sensitivity correction process on a signal on which the digital filtering process is performed.

According to the physical quantity detection circuit of this application example, it is possible to perform the digital filtering process and the sensitivity correction process by sharing the multiplier.

Application Example 6

The physical quantity detection circuit according to the application example described above may further include: a sub-counter that counts a cycle number of the counter and initializes a count value periodically; and a temperature sensor, and the arithmetic operating portion may perform a sensitivity correction amount calculation process of calculating a sensitivity correction amount used for the sensitivity correction process, on the basis of temperature information of the temperature sensor, and the control portion may cause the arithmetic operation unit to perform the sensitivity correction amount calculation process in accordance with the count value of the sub-counter.

According to the physical quantity detection circuit of this application example, the process of calculating the sensitivity correction amount over a plurality of periods of the sampling is performed, thereby allowing the amount of calculation per period of the sampling to be reduced.

Application Example 7

In the physical quantity detection circuit according to the application example described above, when input data of multiplication exceeds the number of input bits of the multiplier, the control portion may cause the multiplier to perform multiplication of each of a plurality of pieces of data into which the input data is divided, in accordance with a count value of the counter, and cause the adder to add a plurality of multiplication results by a bit shift.

According to the physical quantity detection circuit of this application example, the number of bits of the multiplier is able to be reduced, and thus it is possible to considerably reduce the circuit scale of digital processing.

Application Example 8

The physical quantity detection circuit according to the application example described above may include a plurality of adders as the arithmetic operation unit.

According to the physical quantity detection circuit of this application example, an addition required by dividing the multiplication into multiple times and an addition required for another arithmetic operation process are able to be concurrently performed by a separate adder, thereby allowing an increase in the cycle number of the arithmetic operation process to be suppressed.

Application Example 9

This application example is directed to a physical quantity detection device including: a sensor element that outputs a detection signal corresponding to a physical quantity; and any of the physical quantity detection circuits described above.

The physical quantity detection device according to this application example may be, for example, an inertial sensor such as an acceleration sensor, a gyro sensor (angular velocity sensor), or a velocity sensor, and may be a clinometer that measures the angle of inclination on the basis of gravity.

Application Example 10

This application example is directed to an electronic apparatus including any of the physical quantity detection circuits described above.

Application Example 11

This application example is directed to a moving object including any of the physical quantity detection circuits described above.

BRIEF DESCRIPTION OF THE DRAWINGS

The invention will be described with reference to the accompanying drawings, wherein like numbers reference like elements.

FIG. 8 is a diagram illustrating an example of a main arithmetic operation sequence.

FIG. 9 is a diagram illustrating an example of a sub-arithmetic operation sequence.

DESCRIPTION OF EXEMPLARY EMBODIMENTS

Hereinafter, preferred embodiments of the invention will be described in detail with reference to the accompanying drawings. Meanwhile, the embodiments described below are not unduly limited to the disclosure of the invention described in the appended claims. In addition, all the configurations described below are not necessarily essential components of the invention.

1. Physical Quantity Detection Device

Figure 1:
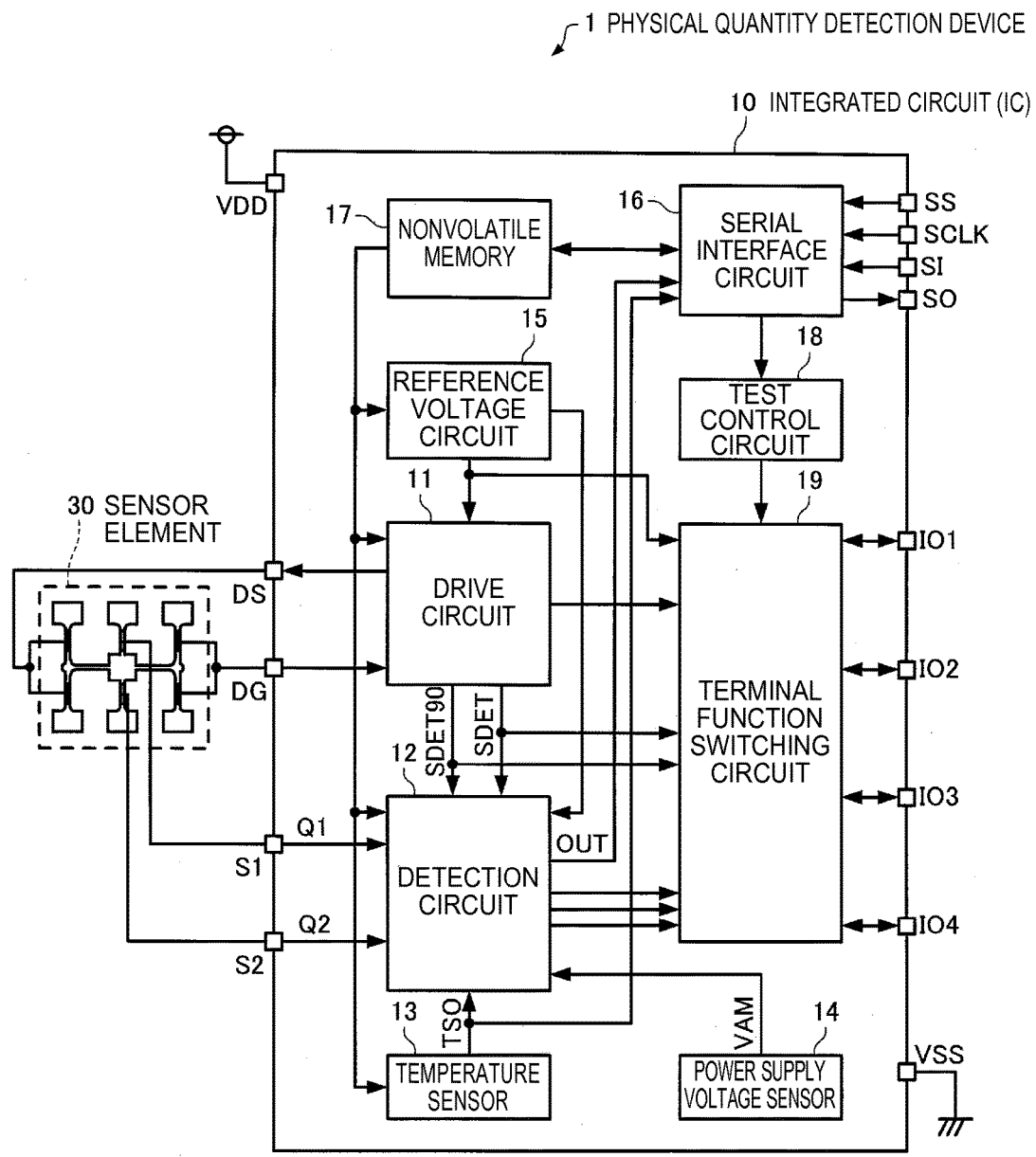
FIG. 1 is a diagram illustrating a configuration example of a physical quantity detection device according to the present embodiment.

FIG. 1 is a diagram illustrating a configuration example of a physical quantity detection device according to the present embodiment. As shown in FIG. 1, a physical quantity detection device 1 according to the present embodiment includes an integrated circuit (IC) 10 and a sensor element 30.

The sensor element 30 has a vibrator element in which a drive electrode and a detection electrode are disposed, and the vibrator element is generally sealed by a package secured with air-tightness in order to increase an oscillation efficiency by minimizing the impedance of the vibrator element. In the present embodiment, the sensor element 30 is provided with a so-called double T-type vibrator element having two T-type drive vibration arms.

Figure 2:
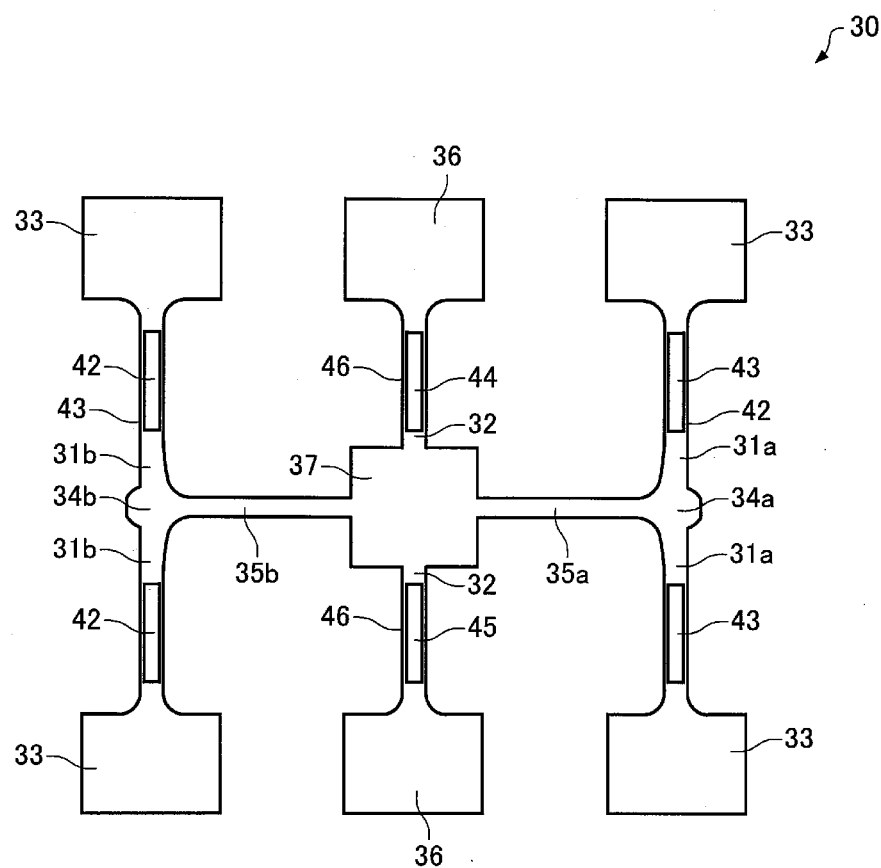
FIG. 2 is a plan view illustrating a vibrator element of a sensor element.

FIG. 2 is a plan view illustrating a vibrator element of the sensor element 30 according to the present embodiment. The sensor element 30 has a double T-type vibrator element formed by, for example, a Z cut quartz crystal substrate. Since the vibrator element made using quartz crystal as a material has an extremely small fluctuation in resonance frequency with a change in temperature, there is the advantage of being able to increase the detection accuracy of angular velocity. Meanwhile, an X-axis, a Y-axis, and a Z-axis in FIG. 2 indicate axes of quartz crystal.

As shown in FIG. 2, the vibrator element of the sensor element 30 is configured such that drive vibration arms 31a and 31b extend in a +Y-axis direction and a −Y-axis direction from two drive basal portions 34a and 34b, respectively. Drive electrodes 42 and 43 are respectively formed on the lateral side and the upper surface of the drive vibration arm 31a, and drive electrodes 43 and 42 are respectively formed on the lateral side and the upper surface of the drive vibration arm 31b. The drive electrodes 42 and 43 are respectively connected to a drive circuit 11 through a DS terminal and a DG terminal of the integrated circuit (IC) 10 shown in FIG. 1.

The drive basal portions 34a and 34b are respectively connected to a rectangular detection basal portion 37 through connecting arms 35a and 35b extending in an −X-axis direction and an +X-axis direction.

A detection vibration arm 32 extends in the +Y-axis direction and the −Y-axis direction from the detection basal portion 37. Detection electrodes 44 and 45 are formed on the upper surface of the detection vibration arm 32, and a common electrode 46 is formed on the lateral side of the detection vibration arm 32. The detection electrodes 44 and 45 are respectively connected to a detection circuit 12 through an S1 terminal and an S2 terminal of the integrated circuit (IC) 10 shown in FIG. 1. In addition, the common electrode 46 is grounded.

Figure 3:
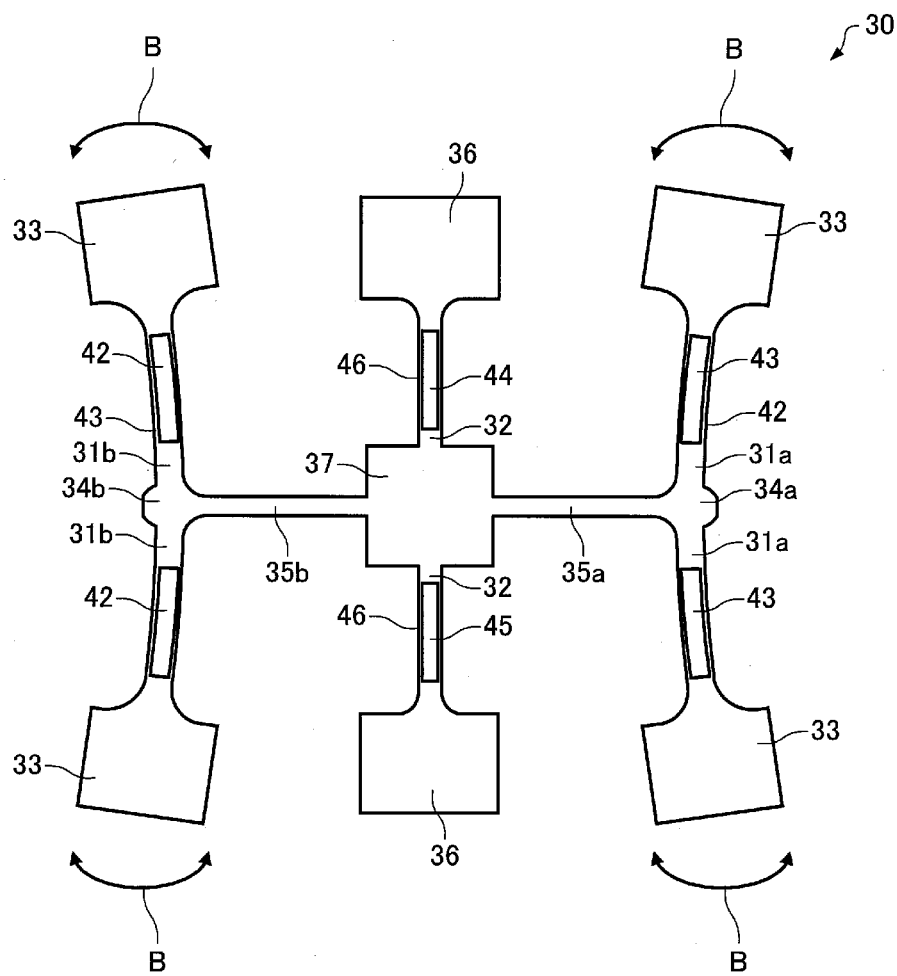
FIG. 3 is a diagram illustrating operations of the sensor element.

When an AC voltage is given as a drive signal between the drive electrode 42 and the drive electrode 43 of the drive vibration arms 31a and 31b, as shown in FIG. 3, the drive vibration arms 31a and 31b perform flexural vibrations (excitation vibrations) in which the leading ends of the two drive vibration arms 31a and 31b repeatedly approach and separate from each other as indicated by arrow B due to an inverse piezoelectric effect.

Figure 4:
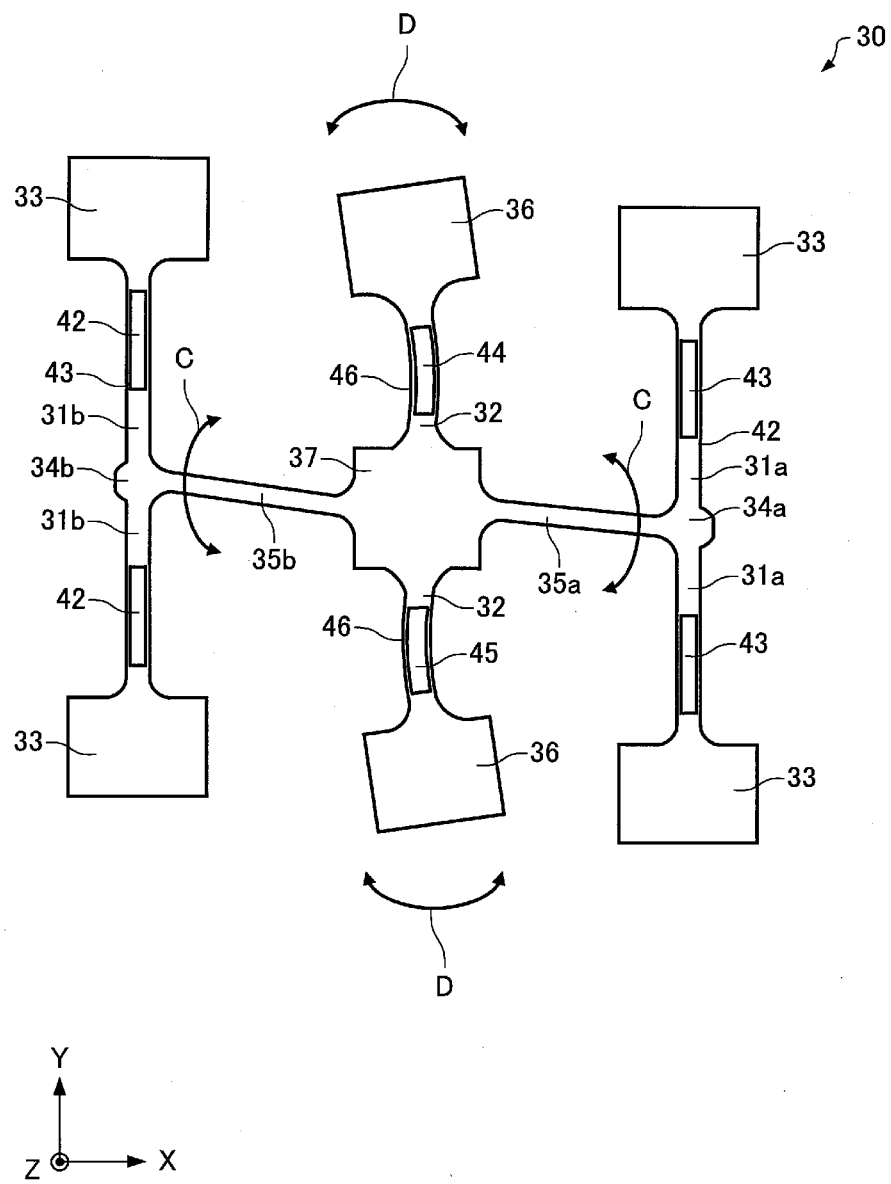
FIG. 4 is a diagram illustrating operations of the sensor element.

In this state, when an angular velocity using the Z-axis as its rotation axis is applied to the vibrator element of the sensor element 30, the drive vibration arms 31a and 31b obtain Coriolis forces in the directions of the flexural vibrations of arrow B and directions perpendicular to both directions of the Z-axis. As a result, as shown in FIG. 4, the connecting arms 35a and 35b perform vibrations as indicated by arrow C. The detection vibration arm 32 performs a flexural vibration as indicated by arrow D in conjunction with the vibrations (arrow C) of the connecting arms 35a and 35b. The flexural vibration of the detection vibration arm 32 and the flexural vibrations (excitation vibrations) of the drive vibration arms 31a and 31b which are associated with the Coriolis force are shifted in phase by 90 degrees.

Incidentally, when the magnitudes of vibrational energies or the magnitudes of vibration amplitudes in a case where the drive vibration arms 31a and 31b perform flexural vibrations (excitation vibrations) are equal to each other in the two drive vibration arms 31a and 31b, the balance between the vibrational energies of the drive vibration arms 31a and 31b is maintained, and the detection vibration arm 32 does not perform the flexural vibration in a state where an angular velocity is not applied to the sensor element 30. On the contrary, when the balance between the vibrational energies of the two drive vibration arms 31a and 31b is lost, the flexural vibration is generated in the detection vibration arm 32 even in a state where an angular velocity is not applied to the sensor element 30. This flexural vibration is called a leakage vibration, and is a flexural vibration of arrow D similar to the vibration based on the Coriolis force, but drive signals have the same phase.

Alternating-current charge based on the flexural vibrations is generated in the detection electrodes 44 and 45 of the detection vibration arm 32 due to a piezoelectric effect. Here, the alternating-current charge generated on the basis of the Coriolis force changes depending on the magnitude of the Coriolis force (in other words, magnitude of an angular velocity applied to the sensor element 30). On the other hand, alternating-current charge generated on the basis of the leakage vibration is constant irrespective of the magnitude of the angular velocity applied to the sensor element 30.

Meanwhile, rectangular weight portions 33 having a width larger than that of the drive vibration arms 31a and 31b are formed on the leading ends of the drive vibration arms 31a and 31b. The weight portions 33 are formed on the leading ends of the drive vibration arms 31a and 31b, and thus it is possible to increase the Coriolis force, and to obtain a desired resonance frequency in a relatively short vibrating arm. Similarly, weight portions 36 having a width larger than that of the detection vibration arm 32 are formed on the leading ends of the detection vibration arm 32. The weight portions 36 are formed on the leading ends of the detection vibration arm 32, and thus it is possible to increase the alternating-current charge generated in the detection electrodes 44 and 45.

In this manner, the sensor element 30 outputs the alternating-current charge (angular velocity component) based on the Coriolis force using the Z-axis as a detection axis and the alternating-current charge (vibration leakage component) based on the leakage vibration of the excitation vibration, through the detection electrodes 44 and 45.

Referring back to FIG. 1, the integrated circuit (IC) 10 includes the drive circuit 11, the detection circuit 12, a temperature sensor 13, a power supply voltage sensor 14, a reference voltage circuit 15, a serial interface circuit 16, a nonvolatile memory 17, a test control circuit 18 and a terminal function switching circuit 19. Meanwhile, the integrated circuit (IC) 10 of the present embodiment may be configured such that some of components shown in FIG. 1 are omitted or changed, or other components are added.

The reference voltage circuit 15 generates a constant current or a constant voltage such as a reference potential (analog ground voltage) from a power supply voltage which is supplied from a VDD terminal, and supplies the current or voltage to the drive circuit 11, the detection circuit 12, and the temperature sensor 13.

The nonvolatile memory 17 holds various trimming data (adjustment data or correction data) for the drive circuit 11, the detection circuit 12, and the temperature sensor 13. The nonvolatile memory 17 can be realized by, for example, a MONOS (Metal Oxide Nitride Oxide Silicon) type memory.

The temperature sensor 13 generates an analog signal TSO of which the voltage changes substantially linearly with a change in temperature, as an output signal. The temperature sensor 13 can be realized using, for example, a bandgap reference circuit.

The power supply voltage sensor 14 A/D-converts the power supply voltage which is supplied from the VDD terminal, and generates power supply voltage data VAM.

The drive circuit 11 generates a drive signal for performing an excitation vibration on the sensor element 30, and supplies the drive signal to a drive electrode 42 of the sensor element 30 through the DS terminal. In addition, the drive circuit 11 is supplied with a drive current (quartz crystal current), generated in a drive electrode 43 by the excitation vibration of the sensor element 30, through the DG terminal, and feedback-controls the amplitude level of the drive signal so that the amplitude of the drive current is held constant. In addition, the drive circuit 11 generates a signal SDET having the same phase as that of the drive signal and a signal SDET90 having a phase shifted by 90 degrees with respect to that of the drive signal, and supplies these signals to the detection circuit 12.

The detection circuit 12 (an example of a physical quantity detection circuit) is supplied with alternating-current charges (detection currents) Q1 and Q2, respectively generated in two detection electrodes 114 and 115 of the sensor element 30, through an S1 terminal and an S2 terminal, detects angular velocity components contained in the alternating-current charges Q1 and Q2, and generates angular velocity data OUT (an example of arithmetic operation data) having digital codes according to the magnitudes of the angular velocity components. As described later, in a process of generating the angular velocity data OUT, the detection circuit 12 performs offset correction and sensitivity correction using the output signal ISO of the temperature sensor 13, the power supply voltage data VAM which is output by the power supply voltage sensor 14, and the trimming data stored in the nonvolatile memory 17. The angular velocity data OUT which is generated by the detection circuit 12 is supplied to the serial interface circuit 16.

The serial interface circuit 16 is supplied with a selection signal, a clock signal, and a serial input signal, respectively, through an SS terminal, a SCLK terminal, and an SI terminal. The serial interface circuit 16 samples the serial input signal using the clock signal when the selection signal is enabled, and performs a process of analyzing a command contained in the serial input signal or a process of converting serial data contained in the serial input signal into parallel data. Further, the serial interface circuit 16 performs a process of writing (setting) and reading data to and from the nonvolatile memory 17 or an internal register (not shown), in accordance with the command. In addition, the serial interface circuit 16 converts the angular velocity data OUT generated by the detection circuit 12, the data which is read out from the nonvolatile memory 17 or the internal register, and the like into the serial data, and performs a process of outputting the converted resultants to the outside through an SO terminal.

The terminal function switching circuit 19 switches connection destinations of four terminals of 101, 102, 103, and 104. For example, the terminal function switching circuit 19 can select output signals or internal signals of the drive circuit 11, the detection circuit 12, and the reference voltage circuit 15, under the control of the test control circuit 18, output any of 101, 102, 103, and 104 to the outside, or supply signals which are input from any of 101, 102, 103, and 104 to the outside, to the drive circuit 11, the detection circuit 12, and the reference voltage circuit 15.

The test control circuit 18 controls the switching of the connection destinations of four terminals of 101, 102, 103, and 104 in accordance with setting values received from the serial interface circuit 16.

Figure 5:
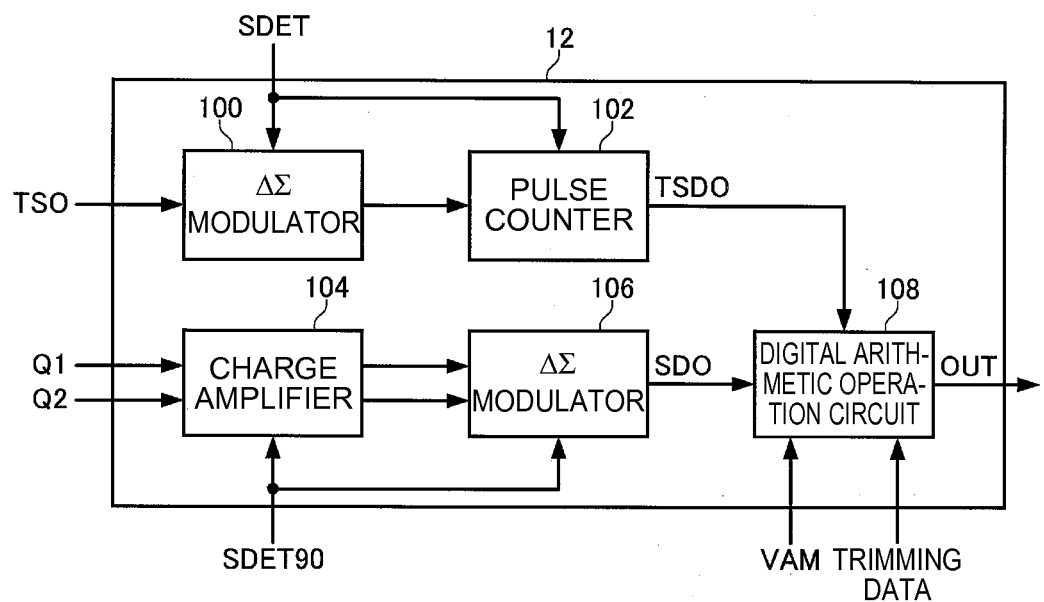
FIG. 5 is a diagram illustrating a configuration example of a detection circuit.

FIG. 5 is a diagram illustrating a configuration example of the detection circuit 12. As shown in FIG. 5, the detection circuit 12 includes a $\Delta\Sigma$ modulator 100, a pulse counter 102, a charge amplifier 104, a $\Delta\Sigma$ modulator 106 and a digital arithmetic operation circuit 108. Meanwhile, the detection circuit 12 of the present embodiment may be configured such that some of components shown in FIG. 5 are omitted or changed, or other components are added.

The $\Delta\Sigma$ modulator 100 periodically converts the output signal TSO of the temperature sensor 13 into 1-bit bitstream data, using the signal SDET generated by the drive circuit 11 as a sampling clock.

The pulse counter 102 adds bit stream data which is output by the $\Delta\Sigma$ modulator 100 in order in synchronization with the signal SDET generated by the drive circuit 11, and generates temperature data TSDO.

The charge amplifier 104 integrates the alternating-current charges Q1 and Q2 generated from two detection electrodes of the sensor element 30 in synchronization with the signal SDET90 (signal having a phase shifted by 90 degrees with respect to that of the drive signal) generated by the drive circuit 11, and outputs a differential voltage. As described above, in the sensor element 30, the flexural vibration of the detection vibration arm 32 and the flexural vibrations (excitation vibrations) of the drive vibration arms 31*a* and 31*b* which are associated with the Coriolis force are shifted in phase by 90 degrees, and thus the charge amplifier 104 integrates the alternating-current charge (angular velocity component) based on the Coriolis force. However, the leakage vibration component has the same phase as that of the drive signal, and thus is not integrated. Therefore, only the angular velocity component is contained in the differential voltage which is output by the charge amplifier 104.

The $\Delta\Sigma$ modulator 106 converts the differential voltage (angular velocity component) which is output by the charge amplifier 104 into 1-bit bitstream data SDO, using the signal SDET90 generated by the drive circuit 11 as a sampling clock. In other words, the $\Delta\Sigma$ modulator 106 used as an A/D converter periodically samples the differential voltage (angular velocity component) which is output by the charge amplifier 104 to perform the digitization thereof, and converts the digitized differential voltage into the 1-bit bitstream data SDO.

The digital arithmetic operation circuit 108 performs a predetermined arithmetic operation process on the bit stream data SDO which is output by the $\Delta\Sigma$ modulator 106, using the temperature data TSDO generated by the pulse counter 102, the power supply voltage data VAM generated by the power supply voltage sensor 14, and the trimming data stored in the nonvolatile memory 17, and generates the angular velocity data OUT having a digital code according to the magnitude of the angular velocity component.

Figure 6:
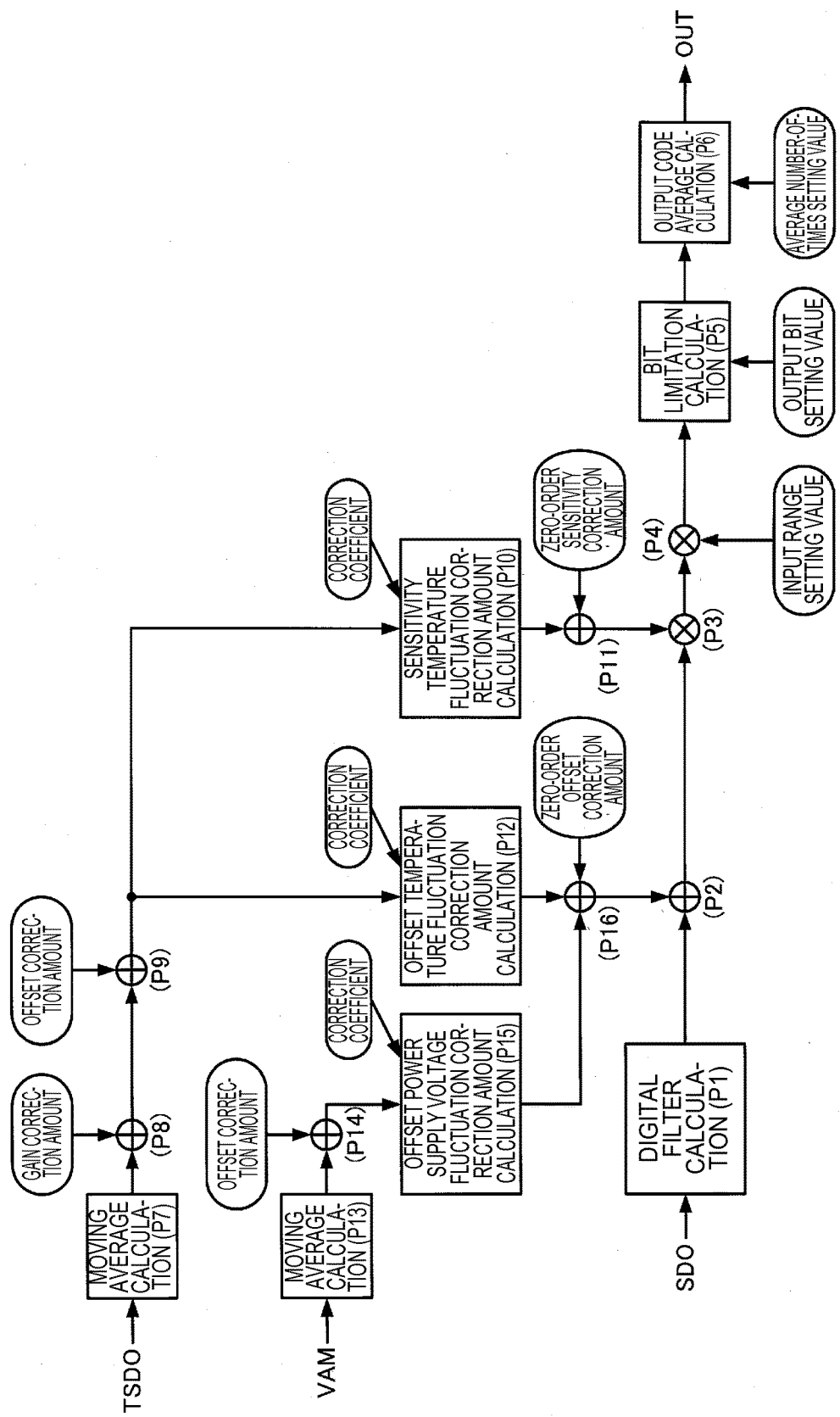
FIG. 6 is a diagram illustrating a flow of arithmetic operation processes performed by a digital arithmetic operation circuit.

FIG. 6 is a diagram illustrating a flow of arithmetic operation processes performed by the digital arithmetic operation circuit 108. As shown in FIG. 6, the digital arithmetic operation circuit 108 performs digital filter calculation (P1) of cutting a high frequency component with respect to the 1-bit bitstream data SDO, and generates angular velocity data. In the present embodiment, an 8th-order IIR filter is adopted as a digital filter, and the transfer function thereof is represented by the following expression (1).

$$Y = \frac{a_0 + a_1 * Z^{-1} + a_2 * Z^{-2} + \ldots + a_8 * Z^{-8}}{1 + b_1 * Z^{-1} + b_2 * Z^{-2} + \ldots + b_8 * Z^{-8}} * X \quad (1)$$

In addition, the digital arithmetic operation circuit 108 performs offset correction calculation (P2) of adding an offset correction amount and a sensitivity correction calculation (P3) of multiplying a sensitivity correction amount, with respect to the angular velocity data generated by the digital filter calculation (P1).

In addition, the digital arithmetic operation circuit 108 multiplies the angular velocity data, on which the offset correction calculation (P2) and the sensitivity correction calculation (P3) are performed, by an input range setting value, and performs input range calculation (P4) of adjusting an output range of angular velocity data which is output by the physical quantity detection device 1 to an input range of an IC connected to the latter stage of the physical quantity detection device 1.

In addition, the digital arithmetic operation circuit 108 performs bit limitation calculation (P5) of rounding off a least significant bit by cutting (shifting) a low-order bit of the number of bits according to the output bit setting value, with respect to the angular velocity data on which the input range calculation (P4) is performed.

In addition, the digital arithmetic operation circuit 108 performs output code average calculation (P6) of calculating an average value of N pieces of angular velocity data on which the bit limitation calculation (P5) is performed, in accordance with an average number-of-times setting value. The angular velocity data OUT is obtained by the output code average calculation (P6).

Further, the digital arithmetic operation circuit 108 performs the calculation of the offset correction amount used in the offset correction calculation (P2) and the calculation of the sensitivity correction amount used in the sensitivity correction calculation (P3).

Specifically, the digital arithmetic operation circuit 108 calculates a moving average of the predetermined number of times (for example, four times) with respect to the temperature data TSDO (P7), and performs addition (P8) of a gain correction amount and addition (P9) of the offset correction amount, with respect to the calculation result of the moving average.

In addition, the digital arithmetic operation circuit 108 substitutes the temperature data on which the moving average (P7), the gain correction (P8) and the offset correction (P9) are performed, into a temperature variable of a correction expression (sensitivity temperature fluctuation correction expression) for correcting the sensitivity of the angular velocity data due to a fluctuation in temperature, and performs sensitivity temperature fluctuation correction amount calculation (P10) of obtaining a correction amount (sensitivity temperature fluctuation correction amount) of a fluctuation in sensitivity due to the fluctuation in temperature. In the present embodiment, the sensitivity temperature fluctuation correction expression is a quadratic function expression of a temperature variable T as represented by the following expression (2).

$$a*T^2 + h*T \quad (2)$$

In addition, the digital arithmetic operation circuit 108 adds the sensitivity temperature fluctuation correction amount and a zero-order sensitivity correction amount (sensitivity correction amount independent of temperature) and performs sensitivity correction amount calculation (P11) of obtaining a sensitivity correction amount.

In addition, the digital arithmetic operation circuit 108 substitutes the temperature data on which the moving average (P7), the gain correction (P8) and the offset correction (P9) are performed, into a temperature variable of a correction expression (offset temperature fluctuation correction expression) for correcting a fluctuation in offset of the angular velocity data due to a fluctuation in temperature, and performs offset temperature fluctuation correction amount calculation (P12) of obtaining a correction amount (offset temperature fluctuation correction amount) of the fluctuation in offset due to the fluctuation in temperature. In the present embodiment, the offset temperature fluctuation correction expression is a quartic function expression of the temperature variable T as represented by the following expression (3).

$$c*T^4 + d*T^3 + e*T^2 + f*T \quad (3)$$

In addition, the digital arithmetic operation circuit 108 calculates a moving average of the predetermined number of times (for example, four times) with respect to the power supply voltage data VAM (P13), and performs addition (P14) of the offset correction amount with respect to the calculation result of the moving average.

In addition, the digital arithmetic operation circuit 108 substitutes the power supply voltage data on which the moving average (P13) and the offset correction (P14) are performed, into a temperature variable of a correction expression (offset power supply voltage fluctuation correction expression) for correcting a fluctuation in offset of the angular velocity data due to a fluctuation in power supply voltage, and performs offset power supply voltage fluctuation correction amount calculation (P15) of obtaining a correction amount (offset power supply voltage fluctuation correction amount) of the fluctuation in offset due to the fluctuation in power supply voltage. In the present embodiment, the offset power supply voltage fluctuation correction expression is a quadratic function expression of a power supply voltage variable V as represented by the following expression (4).

$$g*V^2 + h*V \quad (4)$$

In addition, the digital arithmetic operation circuit 108 adds the offset temperature fluctuation correction amount, the offset power supply voltage fluctuation correction amount, and a zero-order offset correction amount (offset correction amount independent of temperature and power supply voltage) and performs offset correction amount calculation (P16) of obtaining an offset correction amount.

Meanwhile, the gain correction amount and the offset correction amount of the temperature data, the offset correction amount of the power supply voltage data, the correction coefficients (a and b of Expression (2)) of the sensitivity temperature fluctuation correction expression, the correction coefficients (c, d, e, and f of Expression (3)) of the offset temperature fluctuation correction expression, the correction coefficients (g and h of Expression (4)) of the offset power supply voltage fluctuation correction expression, the zero-order offset correction amount, the zero-order sensitivity correction amount, the input range setting value, the output bit setting value, and the average number-of-times setting value are a portion of the trimming data stored in the nonvolatile memory 17.

In the present embodiment, the digital arithmetic operation circuit 108 is configured such that one multiplier and two adders are included as the arithmetic operation unit, and that these arithmetic operation units are allocated to the arithmetic operation processes P1 to P16 in time-division in synchronization with a clock signal MCK sufficiently faster than a sampling rate, to thereby reduce a circuit scale considerably.

Figure 7:
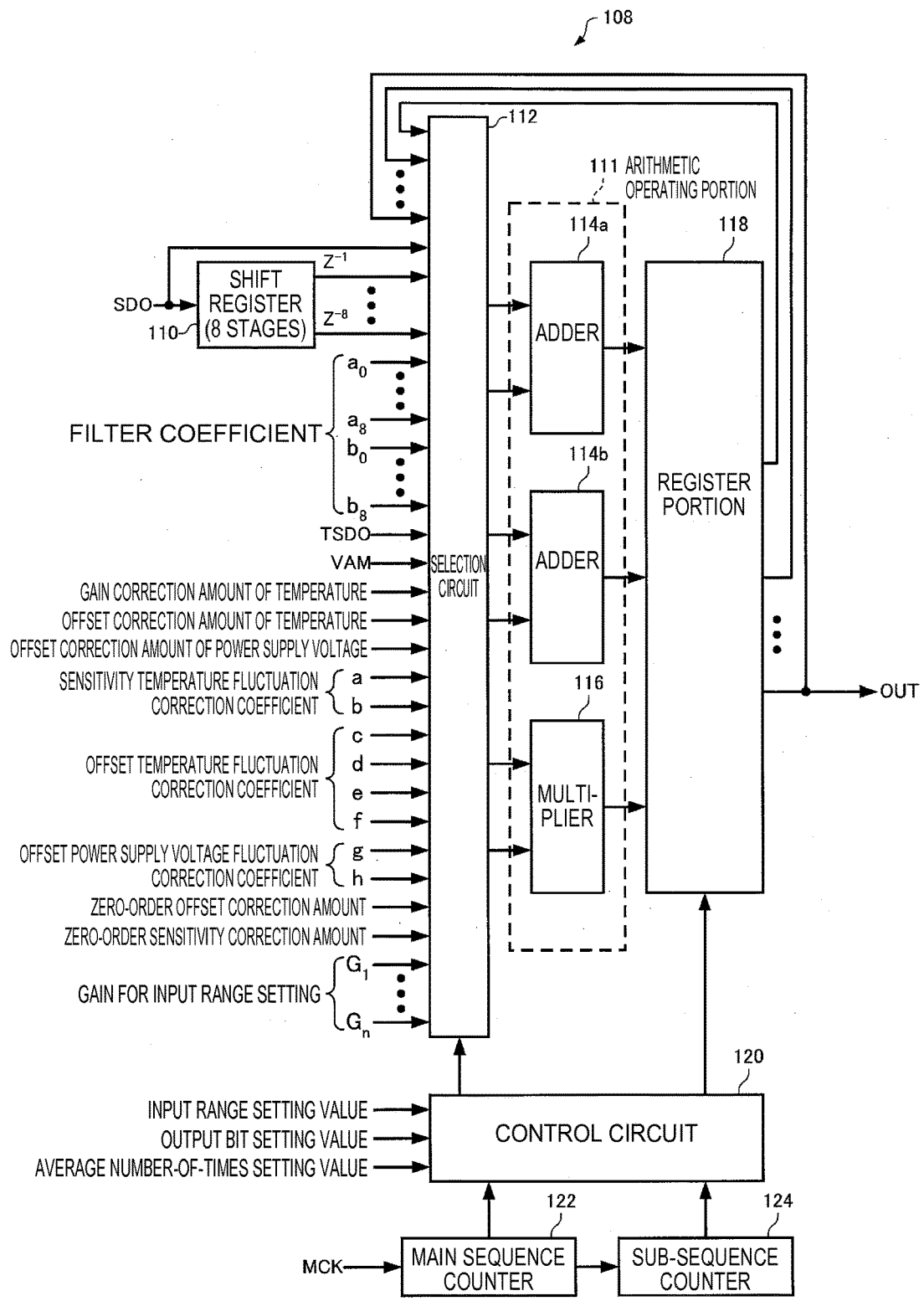
FIG. 7 is a diagram illustrating a configuration example of the digital arithmetic operation circuit.

FIG. 7 is a diagram illustrating a configuration example of the digital arithmetic operation circuit 108. As shown in FIG. 7, the digital arithmetic operation circuit 108 includes a shift register 110, a selection circuit 112, two adders 114a and 114b, a multiplier 116, a register portion 118, a control circuit 120, a main sequence counter 122 and a sub-sequence counter 124. Meanwhile, the digital arithmetic operation circuit 108 of the present embodiment may be configured such that some of components shown in FIG. 7 are omitted or changed, or other components are added.

The shift register 110 shifts and holds SDO (in synchronization with SDET90) whenever the 1-bit bitstream data SDO is updated. Eight pieces of data held in the shift register 110 correspond to $Z^{-1}$ to $Z^{-8}$ of Expression (1) in new order.

The selection circuit 112 selects two pieces of input data of the adder 114a, two pieces of input data of the adder 114b, and two pieces of input data of the multiplier 116 from a plurality of types of input data, in accordance with a control signal from the control circuit 120. The pieces of input data of the selection circuit 112 are data stored in various types of registers included in the register portion 118, data stored in the shift register 110, filter coefficients ($a_0$ to $a_8$ and $b_0$ to $b_8$ of Expression (1)), the temperature data TSDO, the power supply voltage data VAM, the gain correction amount of the temperature data, the offset correction amount of the temperature data, the offset correction amount of the power supply voltage data, the correction coefficients (a and b of Expression (2)) of the sensitivity temperature fluctuation correction expression, the correction coefficient (c, d, e, and f of Expression (3)) of the offset temperature fluctuation correction expression, the correction coefficients (g and h of Expression (4)) of the offset power supply voltage fluctuation correction expression, the zero-order offset correction amount, the zero-order sensitivity correction amount, and gains $G_1$ to $G_n$ for input range setting.

The two adders 114a and 114b add two pieces of input data selected by the selection circuit 112, respectively. Pieces of data of the addition results of the adders 114a and 114b are primarily stored in predetermined registers included in the register portion 118, respectively.

The multiplier 116 multiplies two pieces of input data selected by the selection circuit 112. Pieces of data of the multiplication results of the multiplier 116 are primarily stored in predetermined registers included in the register portion 118, respectively.

In the present embodiment, an arithmetic operating portion 111 is constituted by the adders 114a and 114b and the multiplier 116.

The main sequence counter 122 (an example of a counter) counts the number of clocks of the clock signal MCK, and initializes a count value to 0 whenever the number reaches a predetermined number. In the present embodiment, the clock signal MCK has a frequency 32 times the sampling frequency of the ΔΣ modulator 106, and the main sequence counter 122 repeats a cycle (equivalent to sampling frequency) at which 32 clocks of the clock signal MCK are counted.

The sub-sequence counter 124 (an example of a sub-counter) counts the cycle number (periodic number) of the main sequence counter 122, and initializes a count value to 0 whenever the cycle number reaches a predetermined number. In the present embodiment, the sub-sequence counter 124 is initialized whenever 256 cycles (256 periods) of the main sequence counter 122 are counted.

The control circuit 120 (an example of a control portion) generates a control signal of the selection circuit 112 in accordance with the count value of the main sequence counter 122 and the count value of the sub-sequence counter 124 so that the arithmetic operations P1 to P16 shown in FIG. 6 are executed in a predetermined sequence. In addition, the control circuit 120 generates a control signal of the selection circuit 112 so that the gains $G_1$ to $G_n$ according to the input range setting value are selected at an execution timing of the input range calculation P4. In addition, the control circuit 120 generates a control signal of the selection circuit 112 so that a bit shift according to the output bit setting value or a rounding-off calculation of the least significant bit is executed at an execution timing of the bit limitation calculation P5. In addition, the control circuit 120 controls the update timing of the angular velocity data OUT in conjunction with the average number-of-times setting value. Specifically, when the set average number of times is set to N, the control circuit 120 updates the angular velocity data OUT whenever the average value of N pieces of angular velocity data are calculated, that is, at a rate of 1/N of the sampling rate.

The arithmetic operations of P1 to P6 shown in FIG. 6 are performed whenever the bit stream data SDO is updated, that is, at the same rate as the sampling rate (for example, approximately 3 kHz) of the ΔΣ modulator 106. On the other hand, since the fluctuation in temperature or the fluctuation in power supply voltage is sufficiently later for a change in angular velocity, the arithmetic operations P7 to P16 shown in FIG. 6 are performed at a lower rate (for example, approximately 12 Hz). The main sequence counter 122 manages the sequence of the arithmetic operations of P1 to P6, and the sub-sequence counter 124 manages the sequence of the arithmetic operations of P7 to P16.

FIG. 8 is a diagram illustrating an example of a correspondence relationship (main arithmetic operation sequence) between the count values of the main sequence counter 122 and the arithmetic operations to be executed.

As shown in FIG. 8, when the count values of the main sequence counter 122 are 0 to 24, the digital filter calculation (P1) of the angular velocity data is executed.

In addition, when the count value of the main sequence counter 122 is 25, the offset correction calculation (P2) of the angular velocity data is executed.

In addition, when the count values of the main sequence counter 122 are 26 and 27, the sensitivity correction calculation (P3) of the angular velocity data is executed.

In addition, when the count value of the main sequence counter 122 is 28, the input range calculation (P4) is executed.

In addition, when the count value of the main sequence counter 122 is 29, the bit limitation calculation (P5) is executed.

In addition, when the count value of the main sequence counter 122 is 30, the output code average calculation (P6) is executed.

Further, when the count value of the main sequence counter 122 is 31, any of the arithmetic operations of P7 to P16 is executed in accordance with the count values of the sub-sequence counter 124.

FIG. 9 is a diagram illustrating an example of a correspondence relationship (sub-arithmetic operation sequence) between the count values of the sub-sequence counter 124 and the arithmetic operations to be executed.

As shown in FIG. 9, when the count value of the main sequence counter 122 is 31, and when the count values of the sub-sequence counter 124 are 0 to 5, the moving average calculation (P7) of the temperature data, the gain correction calculation (P8) of the temperature data and the offset correction calculation (P9) of the temperature data are executed.

In addition, when the count values of the sub-sequence counter 124 are 6 to 11, the sensitivity temperature fluctuation correction amount calculation (P10) is executed.

In addition, when the count values of the sub-sequence counter 124 are 12 and 13, the sensitivity correction amount calculation (P11) is executed.

In addition, when the count values of the sub-sequence counter 124 are 14 to 28, the offset temperature fluctuation correction amount calculation (P12) is executed.

In addition, when the count values of the sub-sequence counter 124 are 29 to 35, the moving average calculation (P13) of the power supply voltage data, the offset correction calculation (P14) of the power supply voltage data and the offset power supply voltage fluctuation correction amount calculation (P15) are executed.

In addition, when the count values of the sub-sequence counter 124 are 36 to 38, the offset correction amount calculation (P16) is executed.

Further, when the count value of the main sequence counter 122 is 31, and when the count values of the sub-sequence counter 124 are 39 to 255, the adders 114a and 114b and the multiplier 116 are brought into a standby state without executing any of the arithmetic operation processes.

Meanwhile, in the present embodiment, when input data of multiplication exceeds the number of input bits of the multiplier 116, the control circuit 120 causes the multiplier 116 to perform the multiplication of each of a plurality of pieces of data into which the input data is divided, in accordance with the count value of the main sequence counter 122, and causes the adder 114a or the adder 114b to add a plurality of multiplication results by shifting bits by a predetermined number. In this manner, it is possible to reduce the number of bits of the multiplier 116, and to suppress an increase in the circuit scale. However, this causes the number of times of addition to increase. Therefore, in the present embodiment, in order to be able to execute the arithmetic operations of P1 to P6 within 32 clocks of the clock signal MCK, two adders 114a and 114b are provided, and thus it is possible to concurrently execute the addition of high-order bit data and low-order bit data of the multiplication results and an addition required in another arithmetic operation process.

Figure 10:
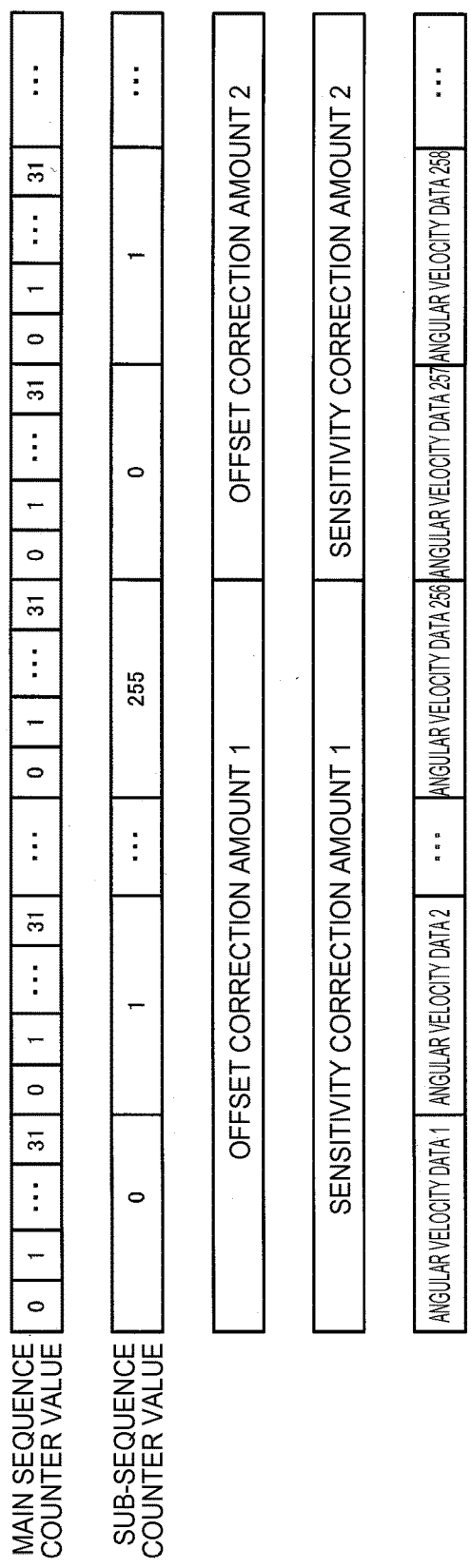
FIG. 10 is a timing chart diagram illustrating an example of update timings of offset correction amounts, sensitivity correction amounts and angular velocity data.

FIG. 10 is a timing chart diagram illustrating an example of update timings of offset correction amounts, sensitivity correction amounts and angular velocity data. As shown in FIG. 10, the count value of the sub-sequence counter 124 increases in increments of 1 whenever the count value of the main sequence counter 122 is initialized to 0. When the sub-sequence counter 124 counts up to 255, the count value returns to 0.

The calculation of the angular velocity data is terminated when the count value of the main sequence counter 122 is 30, but the update of the angular velocity data is performed when the main sequence counter 122 becomes 0 subsequently.

The calculation of the offset correction amount is terminated when the count value of the sub-sequence counter 124 is 38, but the update of the offset correction amount is performed when the sub-sequence counter 124 becomes 0 subsequently. Similarly, the calculation of the sensitivity correction amount is terminated when the count value of the sub-sequence counter 124 is 13, but the update of the sensitivity correction amount is performed when the sub-sequence counter 124 becomes 0 subsequently. Therefore, an offset correction amount 1 and a sensitivity correction amount 1 are used for the calculation of angular velocity data 1 to 256, and an offset correction amount 2 and a sensitivity correction amount 2 are used for the calculation of angular velocity data 257 to 512.

As described above, according to the physical quantity detection device (physical quantity detection circuit) of the present embodiment, the arithmetic operation processes of P1 to P16 are performed at high speed by sharing two adders 114a and 114b and one multiplier 116, thereby allowing high-accuracy angular velocity data to be generated by digital processing while suppressing an increase in the circuit scale.

In addition, according to the physical quantity detection device (physical quantity detection circuit) of the present embodiment, the offset correction amount and the sensitivity correction amount are calculated at a rate lower than a sampling rate, thereby allowing the amount of calculation per period of sampling to be reduced.

In addition, according to the physical quantity detection device (physical quantity detection circuit) of the present embodiment, an offset temperature correction amount and an offset power supply voltage correction are not separately added (added twice) to the angular velocity data in one period of sampling, but the offset correction amount is calculated by the offset correction amount calculation (P16) at a rate lower than a sampling rate, and the offset correction amount is added (added once) to the angular velocity data by the offset correction calculation (P2) in one period of sampling, thereby allowing the amount of calculation to be reduced.

In addition, according to the physical quantity detection device (physical quantity detection circuit) of the present embodiment, when the input data of multiplication exceeds the number of input bits of the multiplier 116, two times of multiplication are performed by division into high-order bits and low-order bits, and the multiplication results are added, to thereby reduce the number of bits of the multiplier 116. Two adders 114a and 114b are provided, and thus the two adders 114a and 114b can be caused to concurrently perform the addition of the multiplication results and an addition required for another arithmetic operation process. Therefore, according to the physical quantity detection device (physical quantity detection circuit) of the present embodiment, it is possible to considerably reduce a circuit scale, and to suppress an increase in the cycle number of the arithmetic operation process.

2. Electronic Apparatus

Figure 11:
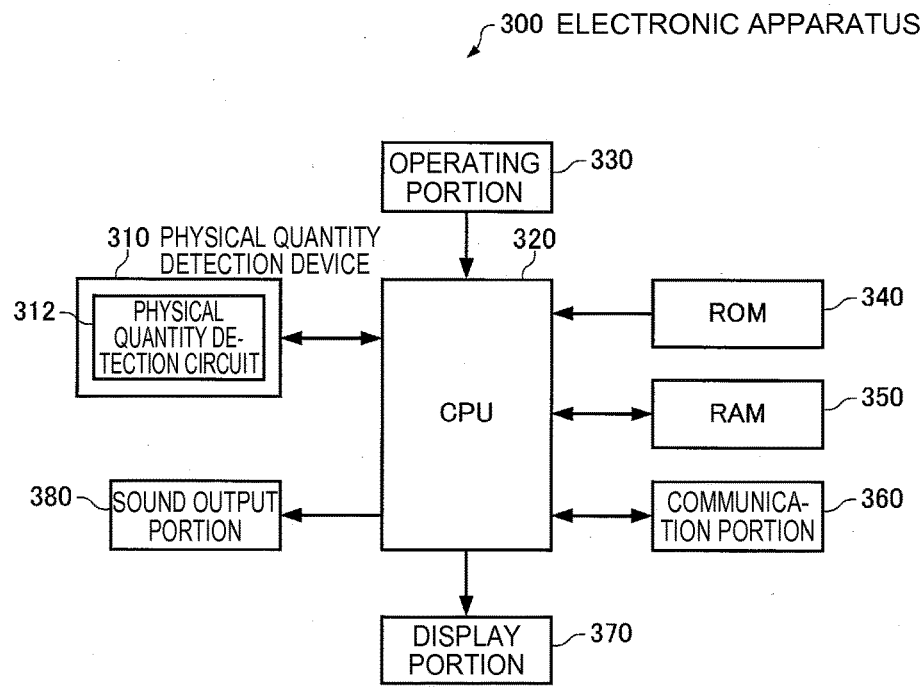
FIG. 11 is a functional block diagram of an electronic apparatus according to the present embodiment.
Figure 12:
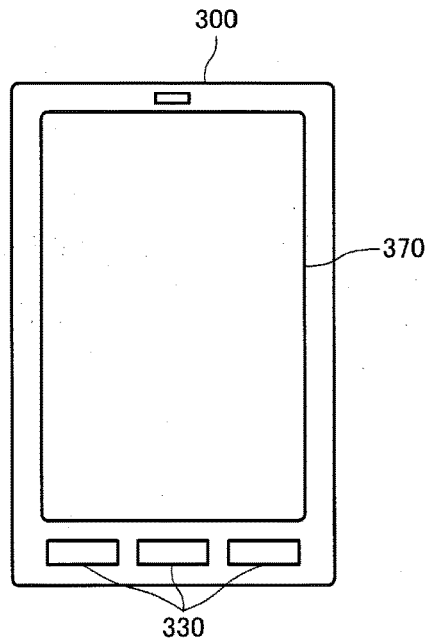
FIG. 12 is a diagram illustrating an example of the appearance of the electronic apparatus according to the present embodiment.

FIG. 11 is a functional block diagram of an electronic apparatus according to the present embodiment. In addition, FIG. 12 is a diagram illustrating an example of the appearance of a smartphone which is an example of the electronic apparatus according to the present embodiment.

An electronic apparatus 300 according to the present embodiment includes a physical quantity detection device 310, a CPU (Central Processing Unit) 320, an operating portion 330, a ROM (Read Only Memory) 340, a RAM (Random Access Memory) 350, a communication portion 360, a display portion 370, and a sound output portion 380. Meanwhile, the electronic apparatus according to the present embodiment has a configuration in which some of components (respective portions) of FIG. 11 are omitted or changed, or may have a configuration in which other components are added.

The physical quantity detection device 310 is a device that detects a physical quantity and outputs a signal (physical quantity signal) of a level depending on the detected physical quantity. The physical quantity detection device may be an inertial sensor that detects at least a portion of physical quantities such as, for example, an acceleration, an angular velocity, a velocity, an angular acceleration, and a force, and may be a clinometer that measures the angle of inclination. As the physical quantity detection device 310, for example, the physical quantity detection device 1 of the present embodiment mentioned above can be applied. In addition, the physical quantity detection device 310 includes a physical quantity detection circuit 312. As the physical quantity detection circuit 312, for example, the detection circuit 12 of the present embodiment mentioned above can be applied.

The CPU 320 performs various types of computation processes and control processes using the physical quantity signal which is output by the physical quantity detection device 310, in accordance with a program stored in the ROM 340 or the like. Besides, the CPU 320 performs various types of processes in response to an operation signal from the operating portion 330, a process of controlling the communication portion 360 in order to perform data communication with the outside, a process of transmitting a display signal for causing the display portion 370 to display a variety of information, a process of causing the sound output portion 380 to output various types of sounds, and the like.

The operating portion 330 is an input device constituted by operation keys, button switches or the like, and outputs an operation signal in response to a user's operation to the CPU 320.

The ROM 340 stores programs, data or the like for causing the CPU 320 to perform various types of computation processes and control processes.

The RAM 350 is used as a work area of the CPU 320, and temporarily stores programs and data which are read out from the ROM 340, data which is input from the operating portion 330, arithmetic operation results executed by the CPU 320 in accordance with various types of programs, and the like.

The communication portion 360 performs a variety of control for establishing data communication between the CPU 320 and an external device.

The display portion 370 is a display device constituted by an LCD (Liquid Crystal Display), an organic EL display or the like, and displays a variety of information on the basis of a display signal which is input from the CPU 320. The display portion 370 may be provided with a touch panel functioning as the operating portion 330.

The sound output portion 380 is a device that outputs a sound of a speaker or the like.

The detection circuit 12 of the present embodiment mentioned above is incorporated as the physical quantity detection circuit 312, thereby allowing an electronic apparatus having high reliability to be realized at a low cost.

As such an electronic apparatus 300, various electronic apparatuses are considered. For example, the electronic device includes a personal computer (for example, mobile-type personal computer, laptop personal computer, notebook type personal computer, or tablet personal computer), a mobile terminal such as a cellular phone, a digital still camera, an ink jet ejecting apparatus (for example, ink jet printer), a storage area network device such as a router or a switch, a local area network device, a television, a video camera, a video tape recorder, a car navigation device, a pager, an electronic notebook (also including a communication function), an electronic dictionary, an electronic calculator, an electronic game console, a game controller, a word processor, a workstation, a TV phone, a security TV monitor, electronic binoculars, a POS terminal, a medical instrument (for example, electronic thermometer, sphygmomanometer, blood glucose monitoring system, electrocardiogram measurement device, ultrasound diagnostic device, and electronic endoscope), a fish finder, various types of measuring apparatus, meters and gauges (for example, meters and gauges of a vehicle, an aircraft, and a vessel), a flight simulator, a head mounted display, a motion trace, motion tracking, a motion controller, PDR (walker position and direction measurement), and the like.

3. Moving Object

Figure 13:
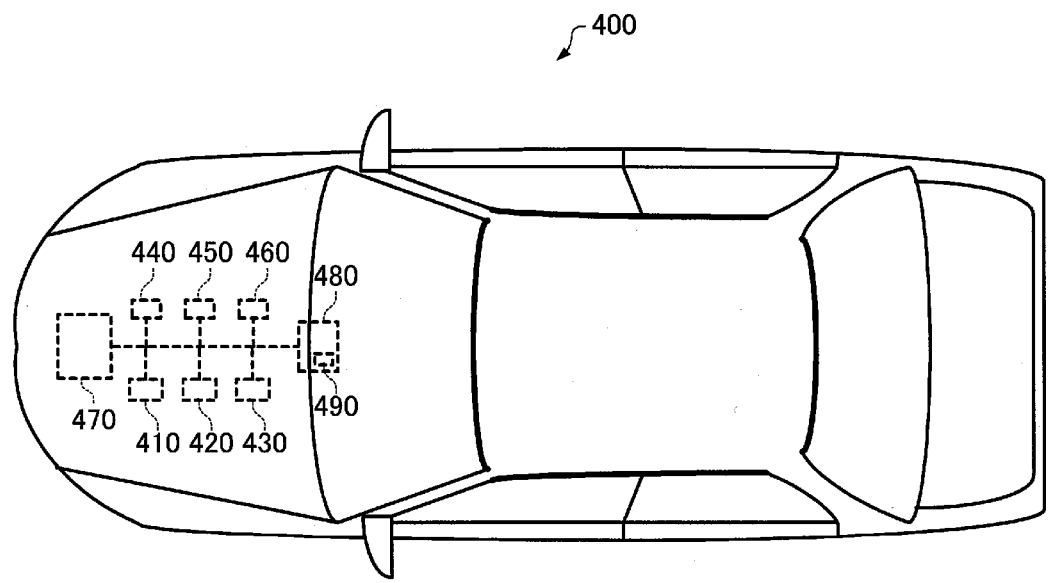
FIG. 13 is a diagram illustrating an example of a moving object according to the present embodiment.

FIG. 13 is a diagram (top view) illustrating an example of a moving object according to the present embodiment. A moving object 400 shown in FIG. 13 includes physical quantity detection devices 410, 420, and 430, controllers 440, 450, and 460, a battery 470, and a navigation device 480. Meanwhile, the moving object according to the present embodiment may have a configuration in which some of the components (respective portions) of FIG. 13 are omitted or changed, and may have a configuration in which other components are added.

The physical quantity detection devices 410, 420, and 430, the controllers 440, 450, and 460, and the navigation device 480 operate through a power supply voltage supplied from the battery 470.

The controllers 440, 450, and 460 perform a variety of controls of a posture control system, a lateral turning prevention system, a brake system and the like using some or all of physical quantity signals which are output by the physical quantity detection devices 410, 420, and 430.

The navigation device 480 displays the position and time of the moving object 400 and a variety of other information on a display device, on the basis of output information of a built-in GPS receiver (not shown). In addition, the navigation device 480 has a physical quantity detection device 490 built in, performs the calculation of the position and direction of the moving object 400 on the basis of an output signal of the physical quantity detection device 490 even when GPS radio waves are out of reach, and continues to display necessary information.

The physical quantity detection devices 410, 420, 430, and 490 are devices that output signals (physical quantity signals) of levels depending on the detected physical quantities, and are, for example, an angular velocity sensor, an acceleration sensor, a velocity sensor, and a clinometer, respectively. The physical quantity detection devices 410, 420, 430, and 490 include a physical quantity detection circuit (not shown) that corrects an output signal of a sensor element (not shown) due to a change in temperature or power supply voltage and outputs a physical quantity signal.

For example, the detection circuit 12 according to the present embodiment mentioned above can be applied as the physical quantity detection circuit included in the physical quantity detection devices 410, 420, 430, and 490, or, the physical quantity detection device 1 according to the present embodiment mentioned above can be applied as the physical quantity detection devices 410, 420, 430, and 490, thereby allowing high reliability to be secured at a low cost.

Various moving objects are considered as such a moving object 400. The moving object includes, for example, an automobile (also including an electric automobile), an aircraft such as a jet engine airplane or a helicopter, a vessel, a rocket, a satellite, and the like.

Meanwhile, the invention is not limited to the present embodiment, but various changes and modifications can be made without departing from the scope of the invention.

For example, the vibrator element of the sensor element 30 may not be a double T type, may be, for example, a tuning fork type or a sinking comb type, and may be a tuning bar type having a shape such a triangular prism, a quadrangular prism, a cylindrical shape or the like. In addition, materials of the vibrator element of the sensor element 30 to be used may include, for example, piezoelectric materials of piezoelectric single crystal such as lithium tantalate ($LiTaO_3$) or lithium niobate ($LiNbO_3$), piezoelectric ceramics such as lead zirconate titanate (PZT), and the like instead of quartz crystal ($SiO_2$), and may include a silicon semiconductor. In addition, for example, a structure may be used in which a piezoelectric thin film such as zinc oxide (ZnO) or aluminum nitride (AlN) interposed in a drive electrode is disposed in a portion of the surface of a silicon semiconductor.

In addition, for example, the sensor element 30 is not limited to a piezoelectric sensor element, but may be a vibrating type sensor element such as an electrodynamic type, a capacitance type, an eddy current type, an optical type, or a strain gauge type. Alternatively, the type of the sensor element 30 is not limited to a vibrating type, but may be, for example, an optical type, a rotating type, or a fluid type. In addition, the physical quantity detected by the sensor element 30 is not limited to an angular velocity, but may be an angular acceleration, an acceleration, a velocity, a force or the like.

In addition, although the physical quantity detection device that detects an angular velocity as a physical quantity is shown in the above-mentioned embodiment, the invention is not limited to the angular velocity, but can also be applied to a physical quantity detection device that detects a physical quantity such as an acceleration, a velocity, an angular acceleration, or a force.

Each of the above-mentioned embodiments is an example, and is not limited thereto. For example, each of the embodiments can also be appropriately combined.

The invention includes configurations (for example, configurations having the same functions, methods and results, or configurations having the same objects and effects) which are substantially the same as the configurations described in the above embodiments. In addition, the invention includes configurations in which non-essential elements of the configurations described in the embodiments are replaced. In addition, the invention includes configurations exhibiting the same operations and effects as, or configurations capable of achieving the same objects as, the configurations described in the embodiments. In addition, the invention includes configurations in which known techniques are added to the configurations described in the embodiments.

The entire disclosure of Japanese Patent Application No. 2013-090861, filed Apr. 24, 2013 is expressly incorporated by reference herein.

What is claimed is:

1. A physical quantity detection circuit comprising:
   an A/D converter that digitizes a detection signal corresponding to a physical quantity and outputs detection data;
   an arithmetic operating portion that includes an adder and a multiplier;
   a counter that counts the number of clocks of a clock signal and initializes a count value periodically;
   a control portion that controls the arithmetic operating portion to perform a selected arithmetic operation process from among a plurality of arithmetic operation processes using the adder and the multiplier, wherein the plurality of arithmetic operation processes are different processes, the selected arithmetic operation process is performed at a specific count value associated with the selected arithmetic operation process and tracked by the counter, the arithmetic operating portion performs the selected arithmetic operation process using the detection data and generates arithmetic operation data;
   a register that stores results of the selected arithmetic operation process; and
   a selection circuit that (i) receives a plurality of types of input data, wherein the plurality of types of input data include data output by the A/D converter and data stored in the register and (ii) selects, from the plurality of types of input data, input data for the arithmetic operating portion in accordance with a control signal from the control portion, wherein the arithmetic operating portion is configured to perform the selected arithmetic operation process on the input data selected by the selection circuit in accordance with the control signal,
   and
   the control portion controls the arithmetic operating portion to perform a digital filtering process on the detection data, and
   the control portion controls the multiplier of the arithmetic operating portion to perform a sensitivity correction process on a signal on which the digital filtering process is performed, and
   wherein when input data of multiplication exceeds the number of input bits of the multiplier, the control portion controls the multiplier to perform multiplication of each of a plurality of pieces of data into which the input data is divided, in accordance with a count value of the counter, and controls the adder to add a plurality of multiplication results by a bit shift.

2. The physical quantity detection circuit according to claim 1, wherein the arithmetic operating portion includes a plurality of adders.

3. A physical quantity detection device comprising:
   a sensor element that outputs a detection signal corresponding to a physical quantity; and
   the physical quantity detection circuit according to claim 1.

4. An electronic apparatus comprising the physical quantity detection circuit according to claim 1.

5. A moving object comprising the physical quantity detection circuit according to claim 1.

* * * * *